United States Patent
Saitou

(10) Patent No.: US 10,246,929 B2
(45) Date of Patent: Apr. 2, 2019

(54) MACHINE TOOL

(71) Applicant: FANUC Corporation, Yamanashi (JP)

(72) Inventor: Kiwamu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 15/272,473

(22) Filed: Sep. 22, 2016

(65) Prior Publication Data

US 2017/0096851 A1  Apr. 6, 2017

(30) Foreign Application Priority Data

Oct. 1, 2015 (JP) .................................. 2015-196230

(51) Int. Cl.
*E05F 15/41* (2015.01)
*E05F 15/75* (2015.01)
(Continued)

(52) U.S. Cl.
CPC ................ *E05F 15/75* (2015.01); *B23Q 7/04* (2013.01); *B23Q 11/0891* (2013.01);
(Continued)

(58) Field of Classification Search
CPC ............ B23Q 11/0891; B23Q 11/0075; B23Q 17/00; B23Q 7/04; Y10T 29/5196
See application file for complete search history.

(56) References Cited

U.S. PATENT DOCUMENTS 5,963,000 A * 10/1999 Tsutsumi ................ E05F 15/73
250/221
6,633,094 B1 * 10/2003 Andou .................... E05F 5/003
307/326
(Continued)

FOREIGN PATENT DOCUMENTS

CN 102666006 A 9/2012
CN 103934724 A 7/2014
(Continued)

OTHER PUBLICATIONS

Office Action in JP Application No. 2015-196230, dated Oct. 24, 2017, 9 pp.
(Continued)

*Primary Examiner* — Kawing Chan
*Assistant Examiner* — Zoheb Imtiaz
(74) *Attorney, Agent, or Firm* — Hauptman Ham, LLP

(57) ABSTRACT

The present invention provides machine tool having a door of which the position is changed between the time of machining and when nothing is being machined, and where the moving speed of the door can be changed. The machine tool is provided with: a drive unit that can move the door; a control unit that can control the drive unit for moving the door; a safety signal input unit that takes in a safety signal from the outside of the machine tool; and a door opening and closing speed setting unit that can set the moving speed of the door to a first moving speed in the case where a safety signal is inputted into the signal input unit or to a second moving speed in the case where no safety signal is inputted, and is characterized in that the first moving speed is higher than the second moving speed.

7 Claims, 5 Drawing Sheets

CASE 1: SAFETY SIGNAL IS INPUTTED
DOOR IS IN OPENING AND CLOSING OPERATION
AT FIRST SPEED

(51) Int. Cl.
*E05F 15/603* (2015.01)
*B23Q 11/08* (2006.01)
*B23Q 7/04* (2006.01)

(52) U.S. Cl.
CPC ............ *E05F 15/41* (2015.01); *E05F 15/603* (2015.01); *E05Y 2900/608* (2013.01)

(56) References Cited

U.S. PATENT DOCUMENTS

| | | | | |
|---|---|---|---|---|
| 7,928,678 | B2* | 4/2011 | Imai | E05F 15/632 |
| | | | | 318/468 |
| 8,341,885 | B2* | 1/2013 | Bostyn | E06B 9/11 |
| | | | | 49/26 |
| 2003/0093951 | A1* | 5/2003 | Ikeuchi | E05F 15/74 |
| | | | | 49/31 |
| 2004/0108171 | A1* | 6/2004 | De Coi | B66B 13/26 |
| | | | | 187/316 |
| 2004/0140782 | A1* | 7/2004 | Okabe | E05F 15/43 |
| | | | | 318/445 |
| 2009/0183612 | A1* | 7/2009 | Yamaguchi | B23K 9/013 |
| | | | | 83/74 |
| 2010/0024302 | A1* | 2/2010 | Kakuyama | E05F 15/43 |
| | | | | 49/31 |
| 2010/0164423 | A1* | 7/2010 | Nakayama | G05B 19/0425 |
| | | | | 318/565 |
| 2012/0317884 | A1 | 12/2012 | Park | |
| 2014/0132086 | A1* | 5/2014 | Matsumoto | B23Q 11/0085 |
| | | | | 307/328 |
| 2014/0239867 | A1* | 8/2014 | Bessho | H02H 7/0851 |
| | | | | 318/466 |
| 2014/0286734 | A1* | 9/2014 | Oda | B25J 9/16 |
| | | | | 414/222.01 |
| 2015/0050096 | A1 | 2/2015 | Sato | |
| 2015/0308176 | A1 | 10/2015 | Oda | |

FOREIGN PATENT DOCUMENTS

| | | |
|---|---|---|
| CN | 104369051 A | 2/2015 |
| DE | 4007042 A1 | 9/1991 |
| JP | H03256692 A | 11/1991 |
| JP | H05123931 A | 5/1993 |
| JP | 6-336880 A | 12/1994 |
| JP | H0885031 A | 4/1996 |
| JP | 2000-170444 A | 6/2000 |
| JP | 2001304948 | 10/2001 |
| JP | 2002004715 A | 1/2002 |
| JP | 2002349133 A | 12/2002 |
| JP | 2007-283450 A | 11/2007 |
| JP | 2008207270 A | 9/2008 |
| JP | 2010211467 A | 9/2010 |
| JP | 2014-167201 A | 9/2014 |
| JP | 2014205231 A | 10/2014 |
| JP | 2015-205385 A | 11/2015 |

OTHER PUBLICATIONS

Office Action in CN Application No. 201610875831.2, dated Sep. 29, 2018, 13pp.

* cited by examiner

CASE 1: SAFETY SIGNAL IS INPUTTED
DOOR IS IN OPENING AND CLOSING OPERATION
AT FIRST SPEED

CASE 2: NO SAFETY SIGNAL
DOOR IS IN OPENING AND CLOSING
OPERATION AT SECOND SPEED

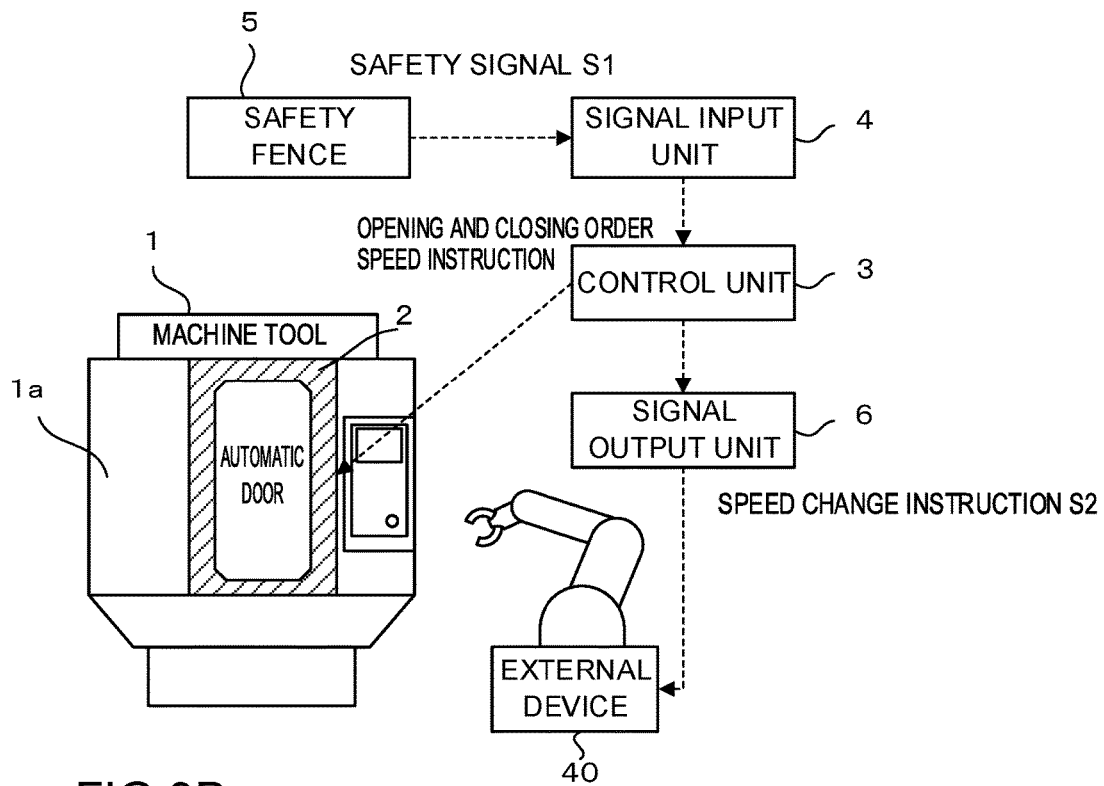
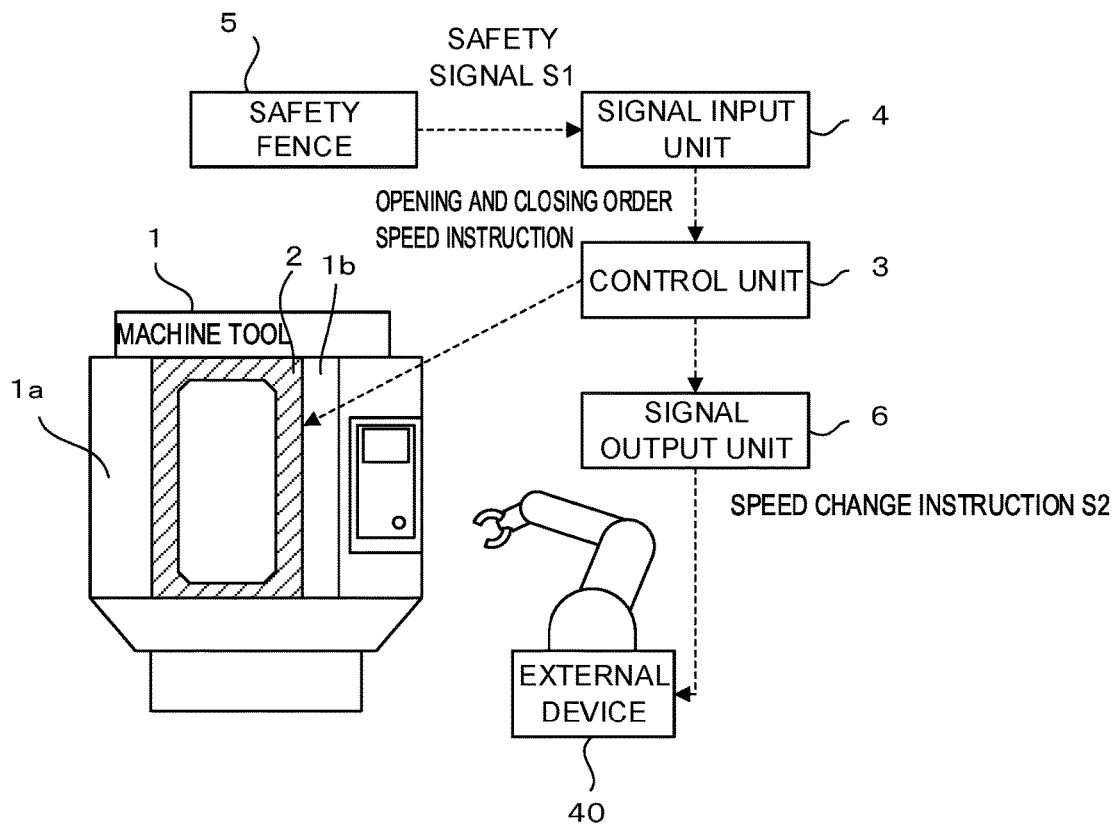

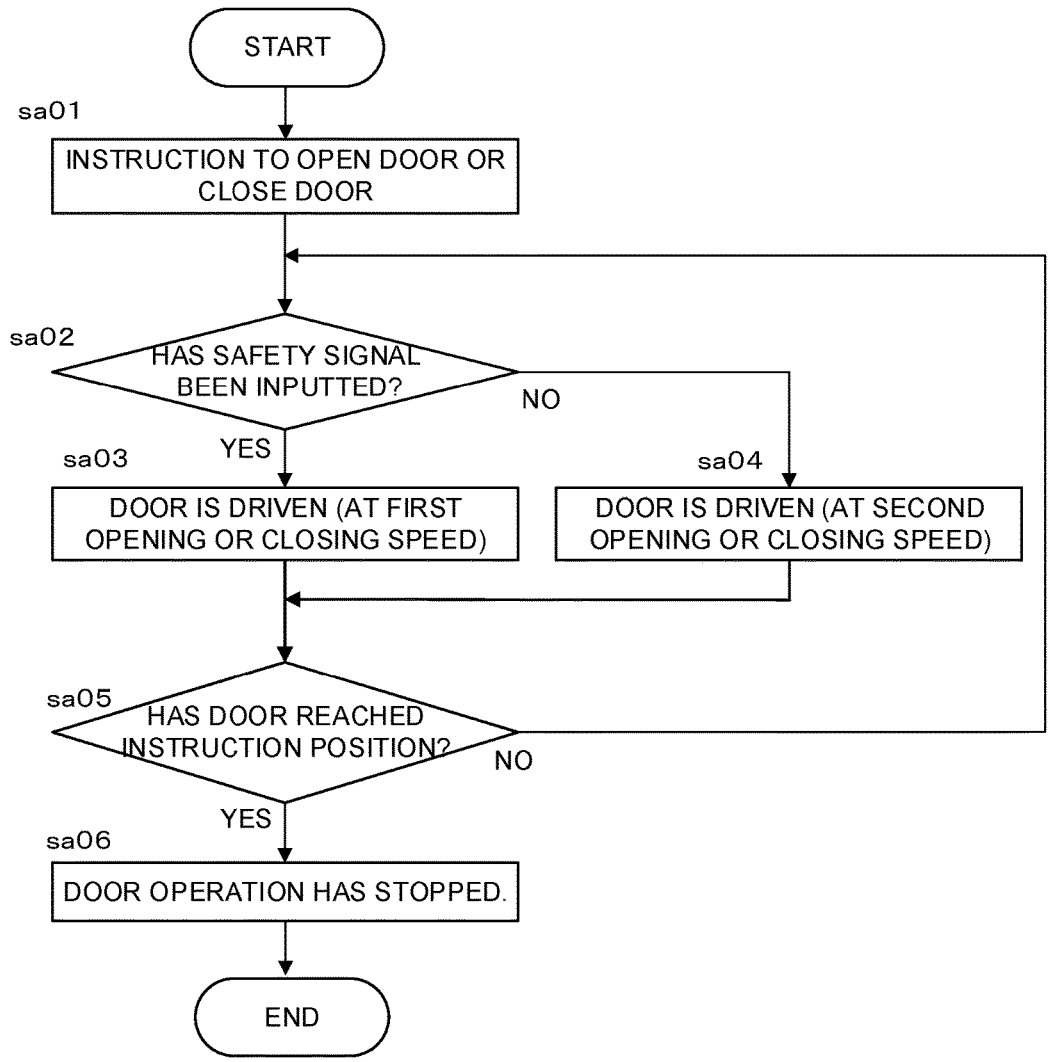

MACHINE TOOL

RELATED APPLICATIONS

The present application claims priority to Japanese Patent Application Number 2015-196230, filed Oct. 1, 2015, the disclosure of which is hereby incorporated by reference herein in its entirety.

BACKGROUND OF THE INVENTION

1. Field of the Invention

The present invention relates to machine tool having a door, and in particular, machine tool having a door of which the opening and closing speeds can be changed.

2. Description of the Related Art

An increase in the opening and closing speeds of the door provided in machine tool can shorten the period of time for changing a work, which then shortens the process cycle, and thus leads to an increase in productivity. Therefore, servo driven automatic doors that can be opened and closed at a high speed have been proposed.

Japanese Unexamined Patent Publication 2014-205231 discloses a machining system that is provided with a machine tool having a door that is closed at the time of machining and that is open when nothing is being machined, an automatic changing device that automatically changes an object to be machined and is provided so as to be able to go inside the machine tool or leave the inside of the machine tool via the door, and an actuator for opening and closing the door so that the opening and closing operations of the door can be carried out over a short period of time.

Japanese Unexamined Patent Publication 2002-349133 discloses a mechanism that mechanically separates the door from the driving source when a load of a certain level or higher is applied to the door in order to increase the level of safety when an operator touches the door.

Japanese Unexamined Patent Publication H5 (1993)-123937 discloses a technology for cutting off the power supply to the motor for the opening and closing operations of a front door in a machine tool where the front door is provided in the machine body cover when it is detected that the door of the machine body cover is open in order to secure the safety when a tool exchanging operation is carried out by opening the front door.

Japanese Unexamined Patent Publication H8 (1996)-85037 discloses a technology for allowing an override control device to change the override value to a predetermined value which is outputted to the control unit of a machine tool upon the reception of a door open signal from a door opening and closing sensor during the operation of the machine tool, and for allowing the control unit of the machine tool to stop or reduce the speed of the operation of the machine tool in accordance with the override value that has been changed.

Japanese Unexamined Patent Publication 2008-207270 discloses a technology for safely stopping a door when the door collides with an obstacle in order to prevent an external force from being applied to the two, and thus prevent the two from being damaged.

Japanese Unexamined Patent Publication 2002-4715 discloses a technology for reducing the frequency in which the door unit opens and closes when the amount of traffic is high in order to increase the level of safety of the passengers and in order to improve the durability of the automatic door.

Japanese Unexamined Patent Publication 2001-304948 and Japanese Unexamined Patent Publication 2010-211467 disclose a technology for calculating the weight of a moveable unit from the torque of the drive unit and the actual acceleration of the moveable unit.

Japanese Unexamined Patent Publication H3 (1991)-256692 discloses a technology for the emergency stop of a machine within a safety fence when the fence is opened.

Automatic doors that open and close at a high speed could be a source that is dangerous for an operator, and therefore, it is necessary for an operator to secure the safety when the operator touches the door in the case where the operator needs to approach the door in order to give instructions to a robot or to maintain the machine.

In accordance with the technology disclosed in Japanese Unexamined Patent Publication 2014-205231, however, the door provided in machine tool is opened and closed by driving a servo motor so that the opening and closing speeds of the door can be controlled, and the disclosed technology does not relate to the safety when an operator touches the door.

In the mechanism disclosed in Japanese Unexamined Patent Publication 2002-349133, such a problem arises that the mechanism operates due to the inertial force when the acceleration or the deceleration of the door is increased. It is desirable to increase the acceleration or the deceleration in order to shorten the period of time when the door opens and closes, and therefore, the above-described mechanism is not appropriate for doors that open and close at a high speed.

Japanese Unexamined Patent Publication H5 (1993)-123937 and Japanese Unexamined Patent Publication H8 (1996)-85037 disclose technologies for stopping or reducing the speed of the mechanism inside machine tool in the case where the door of the machinery opens, which are not technologies for the safety measures of a door that could be a source of danger to an operator.

Japanese Unexamined Patent Publication 2008-207270 discloses a technology for stopping a door in the case where the door collides with an obstacle, but does not state the selection of an appropriate speed.

Japanese Unexamined Patent Publication 2002-4715 discloses a technology for a door of which the opening and closing speeds can be changed, but the technology relates to the control for opening and closing a door in the door unit having a large amount of traffic, and thus, the technology does not relate to a door of machine tool, and a method for determining appropriate opening and closing speeds is not disclosed.

Japanese Unexamined Patent Publication 2001-304948 and Japanese Unexamined Patent Publication 2010-211467 do not disclose a technology relating to the control for opening and closing a door.

In Japanese Unexamined Patent Publication H3 (1991)-256692, the machine within a safety fence makes an emergency stop when the fence is opened, but the sudden stop could cause damage to the machine. In addition, there is a problem that the recovery from the state of an emergency stop takes time.

SUMMARY OF THE INVENTION

In view of the above-described problems with the prior arts, an object of the present invention is to provide machine tool having a door of which the opening and closing speeds can be changed in response to the existence of a safety signal.

The machine tool according to the present invention is provided with a door of which the position is changed between the time of machining and when nothing is being machined and where the moving speed of the above-described door can be changed. The machine tool is provided with: a drive unit that can move the above-described door; a control unit that can control the above-described drive unit; a safety signal input unit that takes in a safety signal from the outside of the above-described machine tool; and a door opening and closing speed setting unit that can set the moving speed of the above-described door to a first moving speed in the case where a safety signal is inputted into the above-described signal input unit or to a second moving speed in the case where no safety signal is inputted, and is characterized in that the above-described first moving speed is higher than the above-described second moving speed.

The machine tool according to the present invention has a door that closes an opening provided in a cover that forms a machining area at the time of machining and opens the opening when nothing is being machined, and of which the opening and closing speeds can be changed. The machine tool is provided with: a drive unit that can move the above-described door; a control unit that can control the above-described drive unit; a safety signal input unit that takes in a safety signal from the outside of the above-described machine tool; and a door opening and closing speed setting unit that can set the moving speed of the above-described door to a first moving speed in the case where a safety signal is inputted into the above-described signal input unit or to a second moving speed in the case where no safety signal is inputted, and is characterized in that the above-described first moving speed is higher than the above-described second moving speed.

The above-described machine tool according to the present invention is characterized in that the speed of the automatic door can be changed depending on the existence of a safety signal. In the case where a safety signal is inputted into the above-described signal input unit, it is regarded that no person is in or around the automatic door and the first speed of the door is set at a high speed, and in the case where no safety signal is inputted into the above-described signal input unit, the second speed of the door is set at a low speed so that the cycle time can be shortened and the safety can be secured at the same time. In addition, the opening and closing speeds are changed depending on the existence of a safety fence, and therefore, the automatic door opens and closes at a low speed even when the setting has not been changed, and thus, the safety is secured in the case where machine tool is incorporated into a system where a safety fence is not originally installed, like a machining cell in cooperation with a robot being used as an external unit.

The machine tool according to the present invention having a cover that forms a machining area may have a signal output unit that can output a speed change instruction to the outside of the machine tool, where a speed change instruction may be outputted from the above-described signal output unit to an external device that goes inside through the opening that is opened or closed by the above-described door when the opening and closing speeds of the above-described door are changed.

In the machine tool according to the present invention having a cover that forms a machining area, a signal output unit that can output a speed change instruction may be provided outside the machine tool so that a speed change instruction can be outputted from the above-described signal output unit to the external device that goes inside through the opening that is opened or closed by the above-described door when the opening and closing speeds of the above-described door are changed.

In the machine tool according to the present invention having the above-described signal output unit, the speed of the automatic door is automatically changed from the first speed to the second speed in the case where the state where a safety signal is inputted has transited to the state where no safety signals are inputted. General systems have an external device that interlocks with the above-described door and goes inside and outside through the opening that is opened or closed by the above-described door (a robot or a gantry for changing a work, for example). In such a case, it is desirable for the operations of the above-described external device to be changed in accordance with the automatic door in order to secure the safety and prevent interference with the door. Generally, external machines that interlock with an automatic door send a signal to and receives a signal from the door control unit, and therefore, it is possible to secure the safety even in the case where the external device itself has not acquired a safety signal.

The machine tool according to the present invention has a load detection unit that can detect the load applied to the above-described door, where in the case where a load having a threshold value or higher is applied to the above-described load detection unit, the above-described door is stopped, the drive force for the above-described door is cut off, or the above-described door is driven in the direction opposite the direction in which the above-described door was moving at the point in time when the above-described load was applied.

The machine tool according to the present invention having the above-described load detection unit is characterized by having a function (hereinafter referred to as a safety function) of stopping the door, cutting off the drive force, or driving the above-described door in the direction opposite the direction in which the above-described door is moving at the point in time when the above-described load is applied in the case where a load having a preset threshold value or higher is applied to the door. The threshold value of the above-described load at which the safety function operates is set sufficiently low so that the safety is increased in the case where an object is engaged with the automatic door. In addition, the door stops operating before a strong force from the door is applied to the object so that the automatic door can be prevented even more from going out of order.

The machine tool according to the present invention having a load detection unit is provided with a load threshold value setting unit that can set a threshold value of the above-described load in the case where a safety signal is inputted into the above-described signal input unit and can set a threshold value of the above-described load in the case where no safety signal is inputted.

Though it is desirable to set the threshold value of the load at which the above-described safety functions operate as low as possible in order to increase the safety in the machine tool according to the present invention having the above-described load threshold value setting unit, there is a risk of the above-described functions operating due to the inertial force at the time of the acceleration or deceleration of the automatic door when the threshold value is small. In order to avoid this risk, it is possible to change the threshold value of the load at which the above-described safety functions operate between the cases where a safety signal is inputted into the above-described signal input unit and a safety signal is not inputted into the above-described signal input unit. In the case where no safety signal is inputted into the above-described signal input unit and the door is opened or closed at a low speed, the threshold value of the load at which the above-described safety functions operate can be set as low as possible so that the safety can be secured when an object makes contact with the door. Meanwhile, in the case where a safety signal is inputted into the above-described signal input unit and the automatic door opens and closes at a high speed or with a high acceleration, the threshold value of the load at which the above-described safety functions operate can be made higher than the load that is caused by the inertial force at the time when the door is accelerated or decelerated so that the time when the door is opened or closed can be shortened.

The drive unit of the above-described door can use a servo motor. The use of a servo motor for the drive unit of the above-described door makes it possible to set the speed of the door easily and precisely.

The machine tool according to the present invention may have a mass measuring unit that can calculate the mass of the above-described door on the basis of the output of the above-described drive unit and the actual acceleration of the above-described door so that one or both of the above-described first speed and the above-described second speed can be automatically determined depending on the above-described mass that has been calculated.

The provision of the above-described mass measuring unit with the machine tool according to the present invention makes it possible to automatically calculate the opening and closing speeds of the automatic door in the case where no safety signal is inputted so that the speeds can be easily set to the values that are appropriate for the mass of the door, and an increase in the safety can be expected in the case where the mass of the door has changed due to the reconstruction of the automatic door or in the custom-made machine tool of which the specifications are different depending on the machine.

The present invention can provide machine tool having a door of which the opening and closing speeds can be changed depending on whether or not a safety signal has been inputted.

BRIEF DESCRIPTION OF THE DRAWINGS

The above-described and other objects and features of the present invention will be clarified from the following descriptions of the embodiments in reference to the accompanying drawings, from among which:

FIG. 3A is a diagram illustrating how the door of machine tool with a cover having the door is controlled to open or close the opening provided in the cover and showing the state where the door is closed;

FIG. 3B is a diagram illustrating how the door of machine tool with a cover having the door is controlled to open or close the opening provided in the cover and showing the state where the door is open;

FIG. 4 is a flow chart illustrating how the door is controlled to open or close;

DETAILED DESCRIPTION OF THE PREFERRED EMBODIMENTS

In the following, the embodiments of the present invention are described in reference to the drawings.

Figure 1:
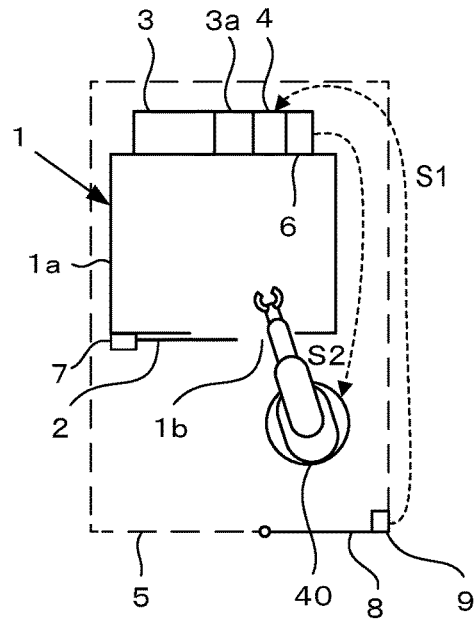
FIG. 1 is a diagram illustrating machine tool in a state where a safety signal has been received.
Figure 2:
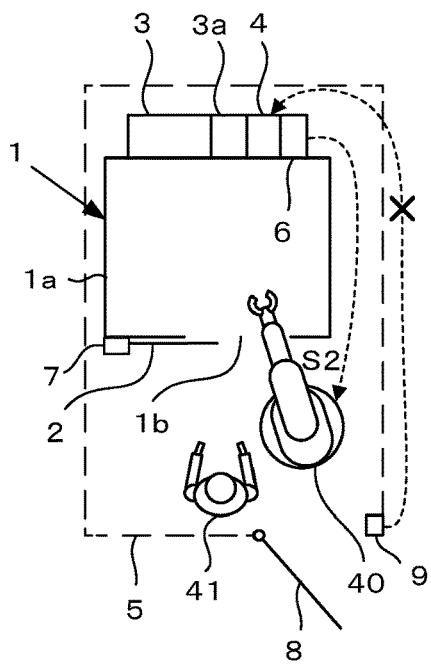
FIG. 2 is a diagram illustrating machine tool in a state where a safety signal has not been received.

FIGS. 1 and 2 are diagrams illustrating a work system formed of machine tool that is controlled by a numeric controller and an external device that works in collaboration with the machine tool. FIG. 1 is a diagram illustrating machine tool in a state where a safety signal has been received, and FIG. 2 is a diagram illustrating machine tool in a state where a safety signal has not been received.

Machine tool 1 and an external device 40 are surrounded by a safety fence 5. The housing of the machine tool 1 is provided with a door 2 that is opened or closed in order for a work to be carried in and carried out. The door 2 is driven by a drive unit 7. The drive unit 7 is controlled by a control unit 3. In addition, the safety fence 5 is provided with a door 8 through which a worker can go into and come out of the area surrounded by the safety fence 5. A safety fence door opening or closing detection unit 9 is attached to the door 8 of the safety fence in order to detect the opening and closing of the door 8. The opening and closing speeds of the door can be set in a door opening and closing speed setting unit 3a as a first opening or closing speed V1 in the case where a safety signal S1 is inputted into a signal input unit 4, and as a second opening or closing speed V2 in the case where no safety signal S1 is inputted. A judging means may be provided in order to prevent the setting of the first opening or closing speed V1 and the second opening or closing speed V2 from getting mixed up.

A detection signal (safety signal S1) indicating the open or closed state of the door 8 of the safety fence that is outputted from the safety fence door opening or closing detection unit 9 is inputted into the signal input unit 4. The door opening and closing speed setting unit 3a always monitors whether or not a safety signal S1 has been inputted into the signal input unit 4, and selects the first opening or closing speed V1 or the second opening or closing speed V2 that have been set in the door opening and closing speed setting unit 3a as the opening or closing speed of the door depending on whether or not a safety signal S1 has been inputted into the signal input unit 4. The control unit 3 controls the drive unit 7 that moves the door 2 in accordance with the opening or closing speed that has been selected by the door opening and closing speed setting unit 3a.

In FIG. 1, the door 8 of the safety fence is closed with no worker going within the safety fence 5, and therefore, a safety signal S1 is outputted from the safety fence door opening or closing detection unit 9 and inputted into the signal input unit 4. In this case, the door opening and closing speed setting unit 3a selects the first opening or closing speed V1 as the opening or closing speed of the door, and the control unit 3 controls and drives the drive unit 7 in accordance with the first opening or closing speed V1 that has been inputted from the door opening and closing speed setting unit 3a so that the door 2 of the machine tool 1 can be operated to open or close.

Meanwhile, in FIG. 2, the door 8 of the safety fence is opened with a probability of a worker 41 being within the safety fence 5 and working. Therefore, no safety signal S1 is inputted from the safety fence door opening or closing detection unit 9. Thus, the control unit 3 controls and drives the drive unit 7 in accordance with the second opening or closing speed V2 that has been set in the door opening and closing speed setting unit 3a so that the door 2 of the machine tool 1 can be moved.

The machine tool 1 is further provided with a signal output unit 6. The signal output unit 6 in the machine tool 1 outputs a speed changing instruction S2 to an external device 40 that is located outside the machine tool. A speed changing instruction S2 for the door 2 is outputted from the signal output unit 6, and the external device 40 abides by the speed changing instruction S2 so that the operational speed of the external device 40 can be changed. The signal output unit 6 may accompany the machine tool 1 or may be independent of the machine tool 1.

FIGS. 3A and 3B are diagrams illustrating how the door of machine tool with a cover having the door is controlled to open or close. In the machine tool 1, the machining area is covered with a cover 1a in order to shield the machining area from the machine tool 1. The cover 1a has an opening 1b in order to carry in and carry out a work or the like.

The door 2 opens or closes the opening 1b. At the time of machining, the opening 1a is closed by the door 2 (see FIG. 3A), and when nothing is being machined, the opening 1a is left open (see FIG. 3B) so that a work can be carried in or carried out.

A safety signal S1 is inputted into the signal input unit 4 from an external safety device such as the safety fence 5. The door opening and closing speed setting unit 3a always monitors whether or not a safety signal S1 has been inputted into the signal input unit 4 and selects the first opening or closing speed V1 as the opening or closing speed of the door in the case where a safety signal S1 has been inputted into the signal input unit 4. The control unit 3 controls the drive unit 7 that can drive the door 2 so that the door 2 can open or close in accordance with the selected door opening or closing speed (gives an open or close order for the door 2 and a speed instruction to the drive unit 7 for the door 2). Furthermore, the door opening and closing speed setting unit 3a outputs a speed changing instruction S2 for the signal output unit 6 to the external device 40.

In the case where there is an external device 40 (a robot or a gantry for changing a work, for example) that goes through the opening 1b of the cover 1a that is opened or closed by the door 2 of the machine tool 1, the signal output unit 6 outputs a speed changing instruction S2 to the external device 40 when the speed of the opening or closing operation of the door 2 is changed.

Upon the reception of a speed changing instruction S2, the external device 40 changes its own operational speed in accordance with the change in the speed of the door 2 of the machine tool 1. In the case where the opening or closing speed of the door 2 is halved, for example, the speed of the external device 40 is halved so that the door 2 and the external device 40 can continue to be interlocked with each other while maintaining the same positional relationship as that before the change in the speed.

FIG. 4 is a flow chart illustrating the opening and closing control of the door. In the following, the procedure is described step-by-step.

[Step sa01] Instruction to open door or close door is carried out.
[Step sa02] Whether or not (YES or NO) a safety signal has been inputted is determined, and the procedure moves to Step sa03 in the case where a safety signal has been inputted, and the procedure moves to Step sa04 in the case where a safety signal has not been inputted.
[Step sa03] The door is driven at the first speed.
[Step sa04] The door is driven at the second speed.
[Step sa05] Whether or not the door has reached an instructed point is determined, and the procedure moves to Step sa06 in the case where the door has reached the instructed point (YES), and the procedure returns to Step sa02 in the case where the door has not reached the instructed point (NO).
[Step sa06] The door operation is stopped, and the process is complete.

Figure 5:
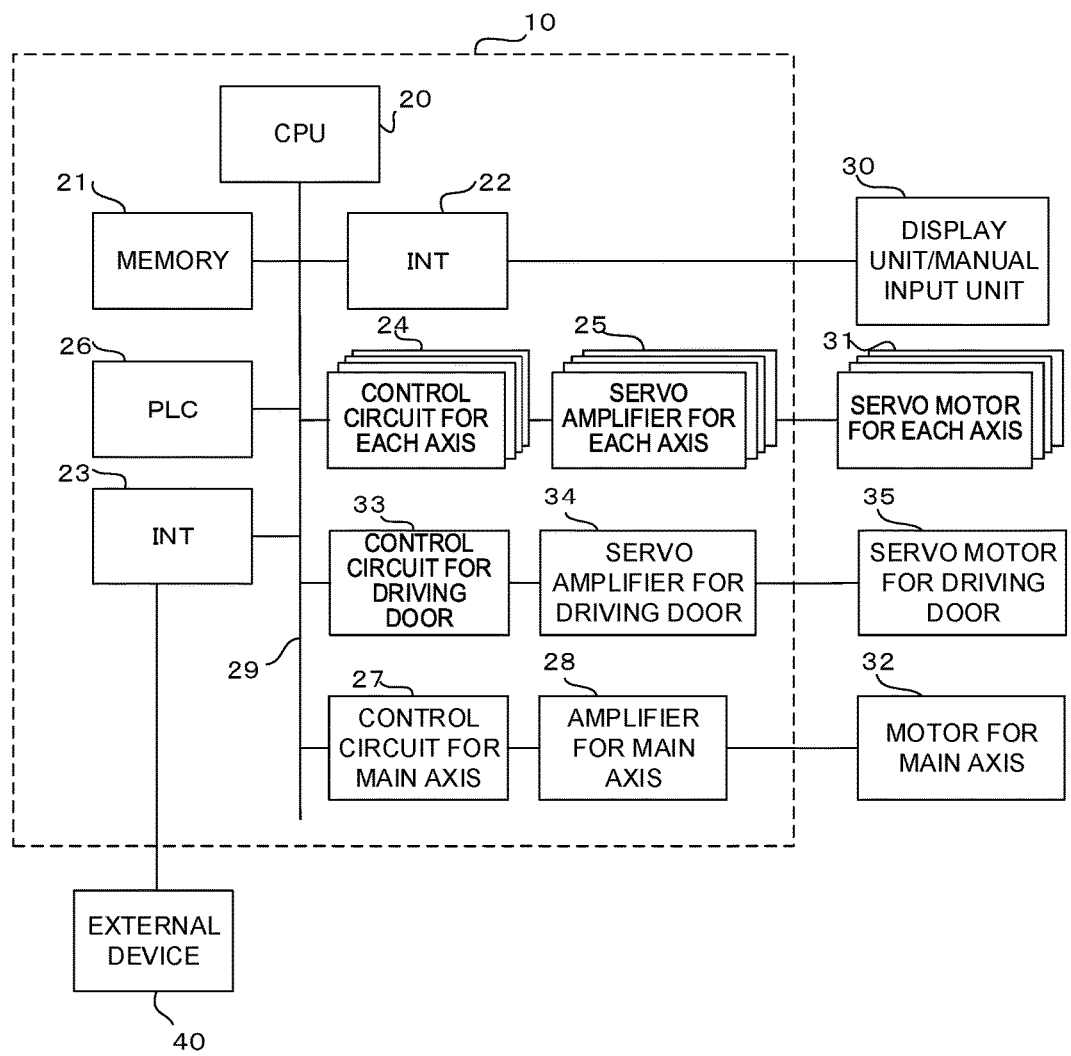
FIG. 5 is a diagram illustrating a work system formed of machine tool that is controlled by a numeric controller and an external device that works in collaboration with the machine tool.

The machine tool 1 is controlled by the numeric controller 10 shown in FIG. 5. The control to move the door 2 of the machine tool 1 that is formed of the control unit 3, the door opening and closing speed setting unit 3a, the signal input unit 4 and the signal output unit 6 shown in FIGS. 1 and 2 may be realized using the numeric controller 10 that controls the machine tool 1. FIG. 5 is a block diagram showing the main parts of the numeric controller 10 that controls the machine tool. A CPU 20 is a processor that totally controls the numeric controller 10 and is connected to a memory 21, interfaces 22 and 23, control circuits 24 for the respective axes, a PLC (programmable logic controller) 26 and a control circuit 27 for the main axis via a bus 29.

The CPU 20 reads out a system program stored in a ROM within the memory 21 via a bus 29 and controls the entirety of the numeric controller 10 in accordance with this system program. The memory 21 is formed of a ROM, a RAM, a non-volatile memory and the like, where the ROM stores a system program and the like and the RAM stores temporary calculation data, display data and other various types of data that has been inputted via a display device/manual input unit 30. In addition, the non-volatile memory is formed of an SRAM that is backed up by a battery.

The interface 23 makes possible the connection with an external device 40 (robot 3, for example). An operational state signal for a robot is inputted into the numeric controller 10 via the interface 23. The PLC 26 outputs a signal to an auxiliary device of the machine tool to be controlled and controls the machine tool using a sequence program that has been incorporated into the numeric controller 10 so as to receive signals from various types of switches equipped in the main body of the machine tool (door 2, see FIG. 1), and carry out a necessary process on the signals that are transferred to the CPU 20. In addition, the PLC 26 receives a detection signal from the safety fence door opening or closing detection unit 9 that detects the opening or closing state of the door 8 that is provided in the safety fence 5.

In addition, the display device/manual input unit 30, made of a display device that is formed as a liquid crystal display device and a manual input unit that is formed as a keyboard, is connected to the interface 22. The control circuits 24 for the respective axes that control the feeding axes such as of the X axis, the Y axis and the Z axis receive an instruction for the moving amount of the respective feeding axes from the CPU 20, and output the instruction for the feeding axis to each servo amplifier 25 so as to drive the servo motor 31 for each feeding axis. In addition, the control circuits 24 for the respective axes receive a feedback signal for the position and the speed from the position/speed detector that is incorporated in each servo motor 31 so as to carry out feedback control on the position and the speed so that the rotational speed of the servo motor becomes the same as the instructed speed under the control.

The control circuit 33 for driving the door that controls the door 2 in the machine tool 1 receives an instruction for the moving amount of the door from the CPU 20 and outputs the instruction to the amplifier 34 for driving the door so as to drive the servo motor 35 for driving the door. In addition, the control circuit 33 for driving the door receives a feedback signal for the location and the speed from the location/speed detector that is incorporated in the servomotor 35 for driving the door, and carries out feedback control on the location and the speed so that the rotational speed of the servo motor becomes the same as the instructed speed under the control.

The servomotor 35 for controlling the door corresponds to the drive unit 7 in FIGS. 1 and 2.

The control circuit 27 for the main axis receives an instruction for the rotational speed of the main axis from the CPU 20 and outputs the instruction for the rotational speed of the main axis to the main axis amplifier 28. The main axis amplifier 28 receives a main axis speed signal so as to rotate the main axis motor 32 at the instructed rotational speed (number of rotations), receives a feedback pulse that is fed back in sync with the rotation from a position coder, not shown, and carries out feedback control on the rotational speed of the main axis so that the speed becomes the same as that of the instruction for the rotational speed of the main axis.

The numeric controller 10 that controls the machine tool 1 is provided with a screen for confirming the operation so that the upper limit value of the speed, the on/off of the machine locking and the effective or ineffective M/S/T codes can be set in a number of patterns in accordance with the confirmation contents (levels). The screen for operation confirmation is displayed on the display screen in the display device/manual input unit 30.

In the above-described embodiment of the present invention, a servo motor is used as the drive unit that drives the door. The use of a servo motor makes it possible to easily control the speed of the door. Here, the drive source for the door is not limited to a servo motor as long as the features of the present invention can be implemented.

In the case where a load having a certain threshold value or higher is applied to a door, the embodiment of the present invention has a function of stopping the door, cutting off the power for driving the door, or driving the door 2 in the direction opposite the direction in which the door was moving at the point in time when the above-described load was applied. A load threshold value setting unit, not shown, may be provided so that the above-described threshold value of the load can be changed in a case where a safety signal S1 is inputted into the signal input unit 4 and in a case where a safety signal S1 is not inputted.

In the case where an automatic door is driven by a servo motor, a method for finding the load from the current value of the motor is a possible example of a mechanism for detecting the load applied to the door 2 (load detection unit). Here, the method is not limited to the example that is cited in the above as long as the method makes it possible to implement the above-described features.

In the case where an automatic door is driven by a servo motor, a method for stopping the door by generating torque in the direction opposite the direction in which the motor was moving is a possible example of a method for stopping the door when a load having a threshold value or higher is applied. Furthermore, the motor may be driven after the door has stopped, and the door may be moved in the direction opposite the direction in which the door was moving at the time when the above-described load was applied so that the object caught by the door can be released.

In the embodiment of the present invention, the second speed of the door can be automatically set. The force of the impact when a worker makes contact with the automatic door depends on the mass of the door and the speed at the time of the contact. In addition, the upper limit of the force of the impact that is regarded to be safe at the time of contact is regulated by the standards, and therefore, an appropriate upper limit of the second speed is determined by the mass of the door.

It is possible to calculate the mass of the door from the output of the drive unit when the door is accelerated or decelerated and the acceleration (actual acceleration) of the door (mass measuring unit). An example of a method for calculating the mass of the door from the output of the drive force is described below. When the mass of the automatic door is m and the force of the drive source that is required to accelerate the door at a constant acceleration a is f, the mass of the door is found as f=ma or m=f/a.

Figure 6:
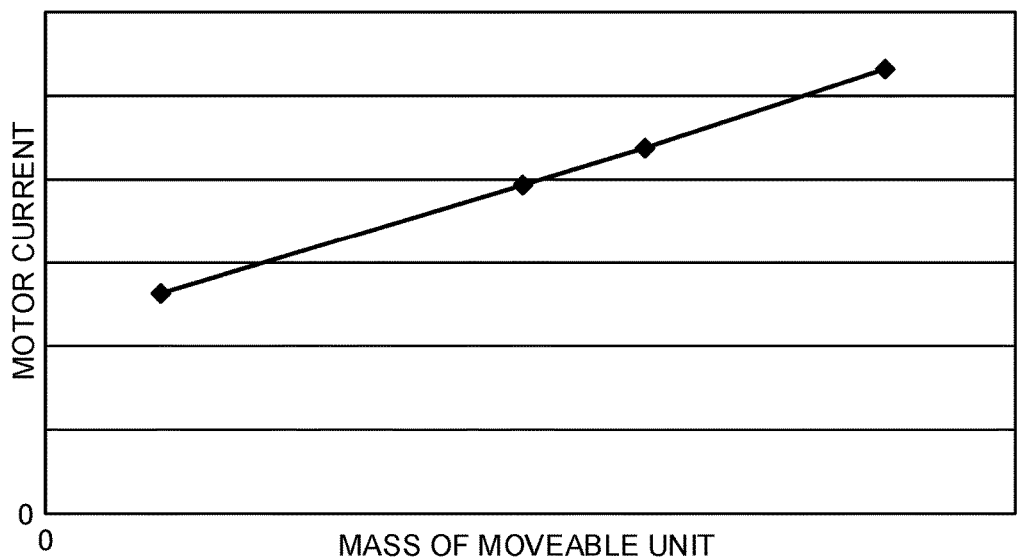
FIG. 6 is a graph showing the relationship between the mass of the moveable unit and the motor current in the case where the door is driven with the same acceleration.

Since the force of the drive unit can be calculated from the value of the flowing current in the case of a servo motor, for example, the mass of the door can be calculated by measuring the acceleration of the door and the force of the drive source. FIG. 6 is a graph showing the relationship between the mass of the moveable unit and the motor current in the case where the door is driven with the same acceleration.

In addition to the above-described method for finding the mass of the door, a method for referring to a data table that has been prepared and stored by measuring in advance the motor current and the acceleration of the door in the case of the operation under certain conditions is possible.

Figure 7:
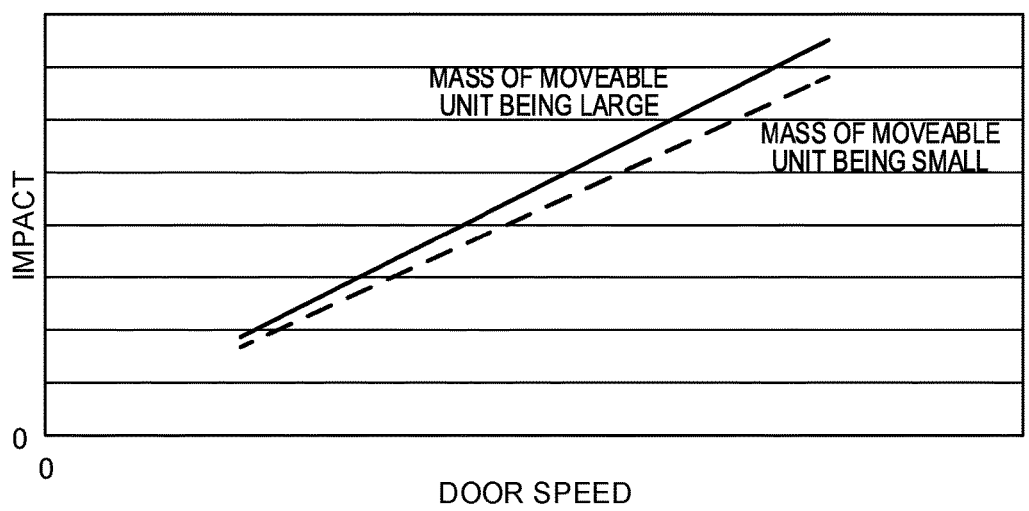
FIG. 7 is a graph showing the relationship between the door speed and the impulse value at the time of contact.

An example of a method for calculating a safe speed from the mass of the automatic door is described below. When the mass of the automatic door is m, the speed of the door at the time of collision is v, and the door is stopped at $\Delta t$ after the collision with an obstacle, the force F of the impact applied to the door at the time of collision can be found as $F\Delta t=mv$ or $F=mv/\Delta t$. In the case where there is no braking of the motor, the force of the impact that is received by the obstacle at the time of collision also becomes the above-described F. FIG. 7 is a graph showing the relationship between the door speed and the impact value at the time of contact.

The force of the impact $F_{MAX}$ that is tolerable in the case where the automatic door collides with a worker is regulated under the safety standard, and therefore, the tolerable maximum speed of the door in the case where it is possible for a worker to make contact with the automatic door can be found as $v_{MAX}=F_{MAX}\Delta t/m$. It is difficult to find $\Delta t$ through calculation, and the value differs depending on the method for driving the door, and therefore, it is possible to find the value by actually using the automatic door.

Since the above-calculated speed is the upper limit speed that is tolerable under the safety standards, the actual second speed may be found by multiplying this speed by a certain safety rate.

In addition to the above-described calculation, a method for selecting a speed in accordance with the estimated mass of the door is possible when a data table is prepared and stored by measuring in advance the force of the impact when the speed and the weight of the automatic door are changed.

As described above, the present invention relates to an automatic door of machine tool and is characterized in that the opening and closing speeds of the door can be changed depending on whether or not a safety signal has been inputted from the outside. In addition, the present invention is characterized by having a function of stopping the door or cutting off the power for driving the door in the case where a load having a threshold value or higher is applied to the above-described automatic door, where the threshold value of the above-described load can be changed depending on whether or not a safety signal has been inputted as described above.

Even in the case where the safety fence is open, it is not necessary to completely stop the door when the speed has been reduced to a speed that is safe when the machine tool that is inside makes contact with a worker. Accordingly, working within the safety fence is possible without stopping the system by automatically reducing the speed of the door to a safe speed when the fence is opened.

In the above-described embodiment of the present invention, the machine tool 1 is provided with a cover for shielding the machining area from the outside. The present invention is not limited to this and can be applied to machine tool where the door is moved to different locations at the time of machining and when nothing is being machined. For example, the invention can be applied to machine tool of such a type that the door is moved to a location between the machining area of the machine tool and an external device so that machining liquid does not splash onto the external device at the time of machining, and the door is moved from the location between the machining area and the external device in the case where a work is carried into or carried out of the machining area when nothing is being machined.

In this case, the regulated moving speeds of the door are set as the first moving speed and the second moving speed in the door opening and closing speed setting unit. The first moving speed and the first opening or closing speed V1 are generally referred to as the first speed, and the second moving speed and the second opening or closing speed are generally referred to as the second speed.

Though the embodiments of the present invention are described in the above, the present invention is not limited to the above described embodiments and can be implemented in other modes by applying appropriate modifications.

The invention claimed is:

1. A machine tool, comprising: a door that closes an opening provided in a cover that forms a machining area at the time of machining and opens the opening when nothing is being machined, wherein the moving speed of the door for opening and closing the opening is changeable; a drive unit configured to move the door; a controller configured to control the drive unit, receive a safety signal from an outside of the machine tool, and set the moving speed of the door to a first moving speed in the case where a safety signal is received or to a second moving speed in the case where no safety signal is received; and a load detection unit configured to detect the load applied to the door, wherein the first moving speed is higher than the second moving speed, and in the case where a load having a threshold value or higher is applied to the load detection unit, the door is stopped, a drive force for the door is cut off, or the door is driven in the direction opposite the direction in which the door was moving at the point in time when the load was applied.

2. The machine tool according to claim 1, wherein the controller is configured to output a speed change instruction to an external device that goes inside through the opening that is opened or closed by the door when the moving speed of the door is changed.

3. A machine tool, comprising: a door of which the position is changed between the time of machining and when nothing is being machined, wherein the moving speed of the door is changeable; a drive unit configured to move the door; a controller configured to control the drive unit, receive a safety signal from an outside of the machine tool, and set the moving speed of the door to a first moving speed in the case where a safety signal is received or to a second moving speed in the case where no safety signal is received; and a load detection unit configured to detect the load applied to the door, wherein the first moving speed is higher than the second moving speed, and in the case where a load having a threshold value or higher is applied to the load detection unit, the door is stopped, a drive force for the door is cut off, or the door is driven in the direction opposite the direction in which the door was moving at the point in time when the load was applied.

4. The machine tool according to claim 3, wherein the load detection unit is configured to set a threshold value of the load in the case where a safety signal is received, and set a threshold value of the load in the case where no safety signal is received.

5. The machine tool according to claim 3, wherein the drive unit includes a servo motor.

6. A machine tool, comprising: a door of which the position is changed between the time of machining and when nothing is being machined, wherein the moving speed of the door is changeable; a drive unit configured to move the door; and a controller configured to control the drive unit, receive a safety signal from an outside of the machine tool, set the moving speed of the door to a first moving speed in the case where a safety signal is received or to a second moving speed in the case where no safety signal is received, calculate a mass of the door on the basis of an output of the drive unit and an actual acceleration of the door, and automatically determine one or both of the first speed and the second speed depending on the mass that has been calculated, wherein the first moving speed is higher than the second moving speed.

7. The machine tool according to claim 1, wherein the load detection unit is configured to set a threshold value of the load in the case where a safety signal is received, and set a threshold value of the load in the case where no safety signal is received.

* * * * *